July 4, 1967 D. W. HARLING 3,329,812
LUMINAIRE OPTICAL ASSEMBLY
Filed March 8, 1965 3 Sheets-Sheet 1

INVENTOR.
Donald W. Harling
BY Fred Wiviott
Attorney

July 4, 1967     D. W. HARLING     3,329,812
LUMINAIRE OPTICAL ASSEMBLY
Filed March 8, 1965     3 Sheets-Sheet 2
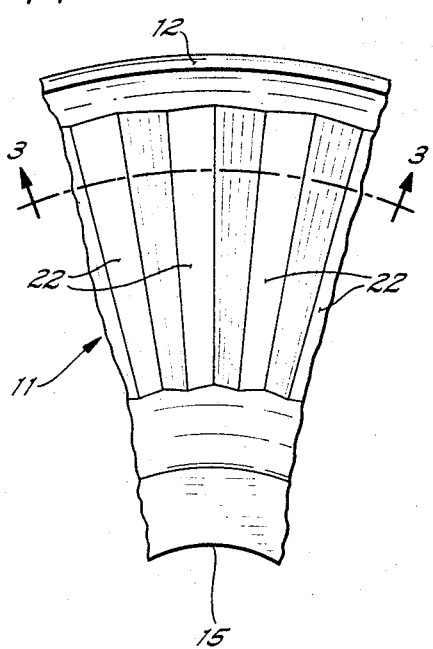
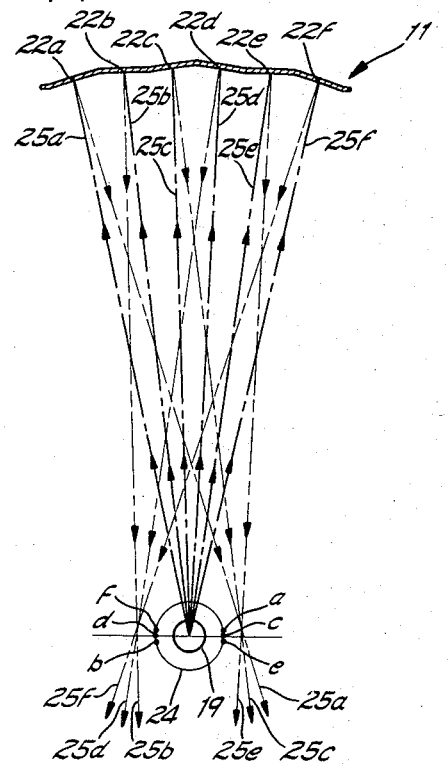
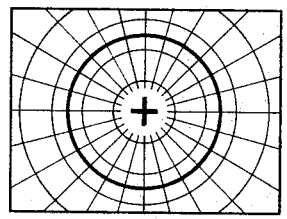
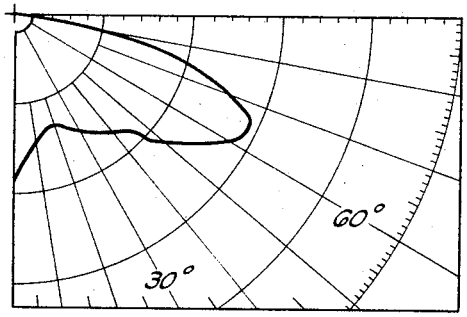
INVENTOR.
Donald W. Harling
BY
Fred Winrott
Attorney July 4, 1967 D. W. HARLING 3,329,812
LUMINAIRE OPTICAL ASSEMBLY
Filed March 8, 1965 3 Sheets-Sheet 3
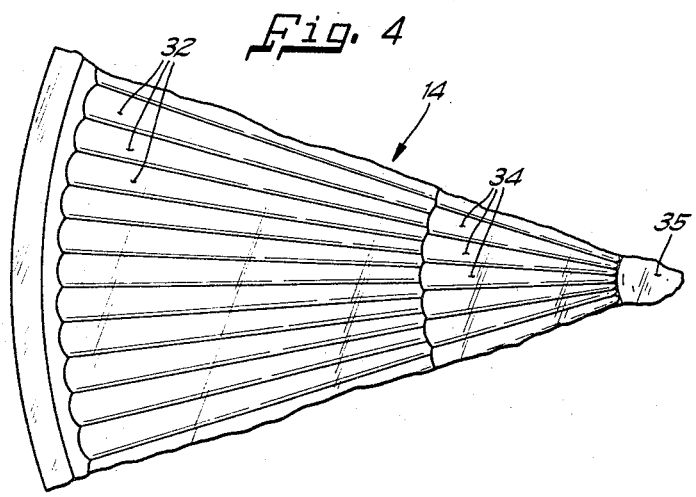
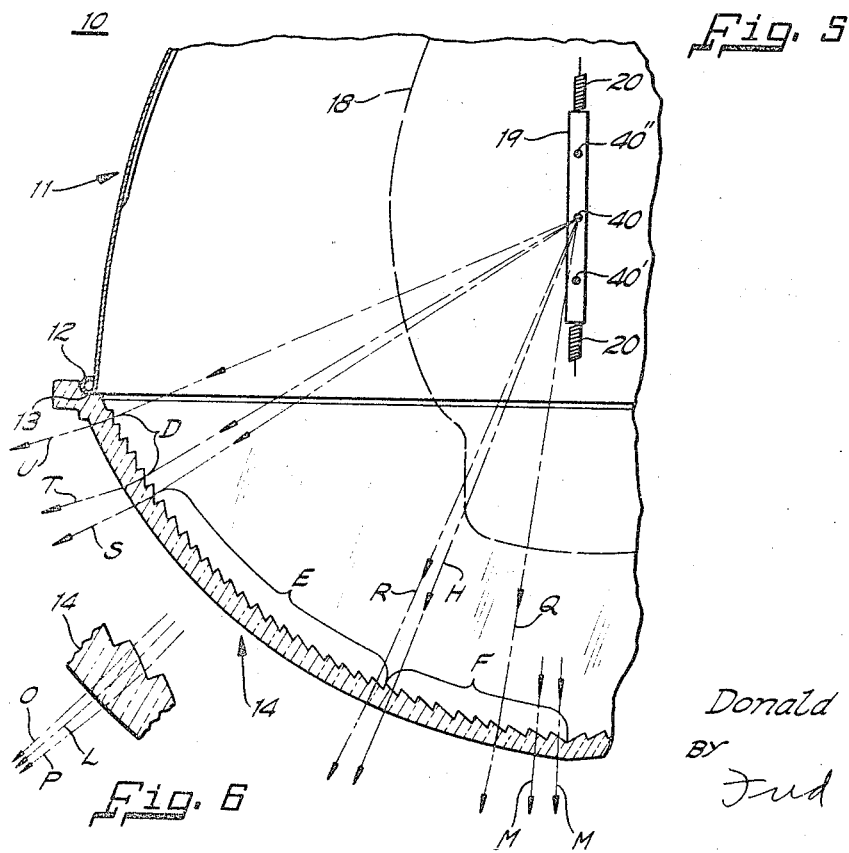
INVENTOR.
Donald W. Harling
BY
Attorney United States Patent Office 3,329,812
Patented July 4, 1967

3,329,812
LUMINAIRE OPTICAL ASSEMBLY
Donald W. Harling, Milwaukee, Wis., assignor to Mc-Graw-Edison Company, Milwaukee, Wis., a corporation of Delaware
Filed Mar. 8, 1965, Ser. No. 437,837
14 Claims. (Cl. 240—93)

This invention relates to luminaires and, more particularly, to optical assemblies for luminaires having a vertically disposed elongate, metallic vapor light source.

In prior art luminaires employing metallic vapor light sources, such as mercury vapor lamps, the optical assemblies were either disposed horizontally or employed an open type refractor. This was thought necessary in order to adequately control the light output from elongate light sources. In certain lighting applications, however, such as in rural areas, where it is desired to distribute the light energy uniformly in all radial directions, horizontally mounted optical assemblies or open type luminaires were not found to be satisfactory.

While optical assemblies for vertically arranged incandescent lamps have been employed heretofore, such optical assemblies are not suitable for the control of the elongate light source of a mercury vapor lamp.

It is a primary object of the invention to provide an optical assembly for the control and redistribution of light from a vertically disposed, elongate metallic vapor light source.

It is another object of the invention to provide an optical assembly for a vertically disposed, elongate, metallic vapor light source wherein a uniform light pattern is obtained.

A further object of the invention is to provide an optical assembly for an elongate, metallic, vapor light source having a relatively low glare factor.

These and other objects and advantages of the instant invention will become more apparent from the detailed description thereof taken with the accompanying drawings wherein:

FIG. 2 is a fragmentary view of the reflector portion of the optical assembly illustrated in FIG. 1;

FIG. 3 is a view taken along lines 3—3 of FIG. 2;

FIG. 4 is a fragmentary view of the refractor portions of the optical assembly illustrated in FIG. 1;

FIG. 5 is a fragmentary view of the optical assembly illustrated in FIG. 1;

FIG. 6 is an enlarged vew of a portion of the refractor according to the instant invention;

FIGS. 8 and 9 are photometric diagrams illustrating light distribution of the optical assembly according to the instant invention in both the vertical and horizontal directions.

Figure 1:
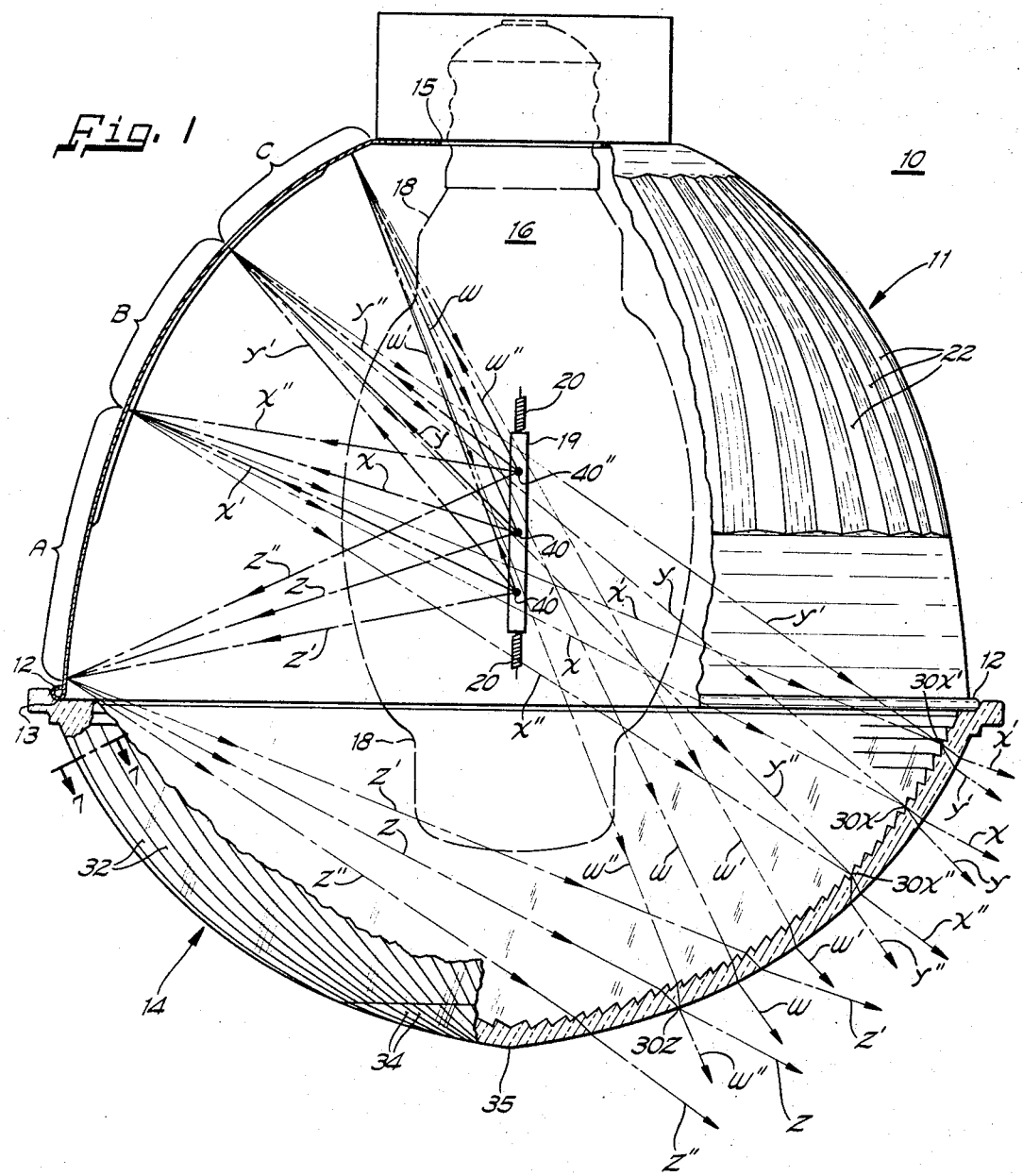
FIG. 1 is a side elevational view, partly in section, of a luminaire optical assembly constructed in accordance with the instant invention.

Referring now to the drawings in greater detail, and particularly to FIG. 1, the optical assembly 10 is shown to include an inverted, generally ovate reflector 11 having a generally circular lower rim 12 which cooperatively engages the upper circular rim 13 of a generally bowl shaped prismatic refractor 14.

Extending through an aperture 15 in the upper end of the reflector 11 and disposed generally within the optical assembly 10 defined by the reflector 11 and the refractor is a generally vertically extending lamp 16 of any suitabel metallic vapor type, such as mercury. As those skilled in the art will appreciate, mercury vapor lamps generally consist of an outer glass shell 18 which encloses an elongate, hollow, sealed quartz tube 19 having spaced apart electrodes 20 disposed at either end. When the lamp is in operation, mercury vapor disposed between the electrodes 20 creates a low resistance path so that an arc is sustained between said electrodes to provide an elongate light source. As seen in FIG. 1, the arcing region between the electrodes 20 of the lamp 16 is disposed along the vertical axis of the reflector 11 and above its lower peripheral rim 12.

The reflector 11 is generally symmetrical about its vertical axis and is circular in any horizontal cross section. In addition, a plurality of equally spaced vertical flutes 22, which start at point 23, a predetermined distance from the lower rim 12 of the reflector 11, extend upward generally to its upper end. As seen in FIGS. 2 and 3, the flutes 22 consist in vertical cross section of intersecting arcs which retain the same curvature throughout their lengths and for this reason become narrower and shallower as they progress from bottom to top.

With reference to FIG. 3, the centers of curvature of the flutes 22 comprise a locus of points which define a circle 24 whose diameter is slightly larger than that of the arc tube 19. Also, the arc centers of pairs of adjacent flutes are disposed on diametrically opposite sides of the circle 24. Thus, the center of curvature $a$ of the flute 22$a$ is diametrically opposite to the center of curvature $b$ of the adjacent flute 22$b$ and the center of curvature $c$ of the flute 22$c$ is opposite the center of curvature $d$ of its adjacent flute 22$d$. As a result, adjacent pairs of flutes 22$a$–22$b$, 22$c$–22$d$ and 22$e$–22$f$, are canted toward the opposite sides of the arc tube 19 so that 22$a$, 22$c$ and 22$e$ are canted toward the right side of the arc tube 19, as viewed in FIG. 3, while the flutes 22$b$, 22$d$ and 22$f$ are canted toward the left side of the arc tube 19.

As a result of this flute configuration, incident light rays on the reflector 22 are reflected uniformly and in avoidance of the arc tube 19. More specifically, light rays 25$a$, 25$c$ and 25$e$ incident on the flutes 22$a$, 22$c$ and 22$e$, respectively, will be reflected to the right side of the arc tube 19, as viewed in FIG. 3, while rays 22$b$, 22$d$ and 22$f$, respectively, incident to flutes 22$b$, 22$d$ and 22$f$ will be reflected to the left side of said arc tube. This assures that none of the light rays incident on the reflector 22 will be reflected back into the light source and absorbed.

The refractor 14, as illustrated in FIGS. 1 and 4, is a generally bowl shaped member of any suitable light transmitting material such as glass. A plurality of annular, concentric, juxtaposed, shaped prisms 30 are formed on the inner surface of the refractor 14 and extend from its upper to its lower end. In addition, a first plurality of convex, arcuate prisms 32 are formed in the outer surface of the refractor 14 and extend from a point adjacent its upper peripheral rim 13, downwardly for a substantial distance along the refractor face. A second plurality of convex arcuate prisms 34 extend from the lower terminus of the flutes 32 to substantially the lower end of the refractor 14 which is defined by a plain circular sector 35. The arc radius of each of the flutes 32 and 34 remains the same throughout its length so that said flutes become narrower and shallower from top to bottom.

Referring again to FIG. 1, the reflector 11 is shown to beformed into three vertically arranged, annular sections A, B and C, which are arcuate in vertical cross section and are tangentially connected to form a smooth reflecting surface from bottom to top.

The lowermost reflector section A is formed so that incident light rays from any given point within the elongate light source 17 will be reflected downwardly and toward the opposite side of the refractor 14 at a prescribed angle and in generally parallel rays. Thus, incident light rays X and Z, emanating from the center 40 of the elongate light source 19, are reflected downwardly toward the opposite side of the refractor 14 as parallel rays X and Z. Incident light rays X' and Z' on the reflector portion A emanating from any common point 40' in the elongate light source 19 which lies below the center 40 will be reflected downwardly and toward the opposite side of the refractor 14 in generally parallel rays which are higher than the rays X and Z. Conversely, light rays X" and Y" emanating from any common point 40" in the elongate light source 19 which lies above the center 40, will be reflected by the reflector portion A downwardly and toward the opposite side of the reflector 14 in generally parallel rays which are at a lower angle than the rays X and Z.

The intermediate section B of the refractor 11 is designed so that incident light rays from any given point in the elongate light source 17 will be reflected downwardly and toward the opposite side of the refractor 14 and be concentrated in a predetermined one of the prisms 30. For example, light rays X and Y emanating from the center 40 of the light source 19 are reflected downwardly so that they converge adjacent the inner surface of the opposite side of the refractor 14, whereby they all enter the same prism 30X.

Incident light rays on the reflector portion B which emanate from point 40' will be reflected downwardly and will converge on prism 30X' which is higher than prism 30X. On the other hand, incident light rays in the area B which emanate from the point 40" will be reflected at a lower angle than light rays X and Y, so that rays X" and Y" will converge on prism 30X" which lies below the prism 30X.

The reflector section C at the upper end of the reflector is constructed and arranged to reflect incident rays from any given point in the elongate source 19 downward so that they converge at a point within the reflector and then diverge toward the refractor 14. Thus, the light rays Y and W from the midpoint 40 converge within the reflector and are divergent when they engage the refractor 14. Similarly, rays Y' and W' from the point 40' are reflected downwardly so that they diverge as they engage the reflector 14 in a beam which is lower than the beam provided by the rays W and X. Similarly, the light rays Y" and W" from the point 40" provide a divergent beam as they pass through the refractor 14 which is higher than the beam provided by the rays Y and W.

As stated hereinabove, the arcuate prisms are annular and concentric around the axis of the refractor. In addition, each of the prisms is formed to have decreasing refractive powers from the lower end of the reflector to the upper end, so that the parallel light rays reflected from the area A of the reflector 11 but which strike different refracting prisms 30 at different angles, will be refracted into parallel beams as they pass through the refractor 14. For example, it can be seen that the ray Z enters the prism 30Z, adjacent the lower end of the refractor 14, while its parallel ray X enters the higher prism 30X. In order for the rays X and Z to be parallel after they pass through the refractor 14, the prism 30Z must bend light ray Z at a greater angle than the prism 30X refracts the ray X. The reflected light rays X' and Z' will similarly be refracted by the prisms 30 in such a manner that they will emerge from the refractor 14 in parallel rays having a slightly higher angle than the beam X–Z and the parallel reflected rays X" and Z" will be refracted by the prisms 30 in such a manner that they will emerge from the refractor 14 in parallel rays which have a lower angle than the beam X–Z.

Each of the light rays X and Y, from the reflector area B, which converge adjacent the inner surface of the reflector 14, will pass through the prism 30X at different angles so that they will emerge divergently as shown by rays X and Y. Thus, each of the light rays from the light center 40 which are incident on the reflected area B will emerge from the refractor 14 at angles between ray X and ray Y. Since ray X is parallel to the main beam X–Z, the light rays from reflector area B are concentrated at vertical angles directly below the main beam. Similarly, light rays from points 40' and 40" on the light source 19 and which are incident on the reflector area B will also be concentrated at vertical angles directly below their main beams.

The reflected converging light rays incident to the reflector area C intercept the refractor 14 in a divergent manner at angles lower than the lowermost beam from the area B. For example, incident light rays on the reflector area C between ray Y and ray W will pass through the refractor 14 at vertical angles below the ray Y.

From the foregoing, it will be appreciated that the light from the elongate source 17 which is reflected by the reflector 11 provides a relatively broad main beam and, in addition, light distributed through a relatively wide angle below the main beam.

Reference is now made to FIG. 5, which shows the control and distribution of direct light from the elongate source 19 by the refractor 14. Light rays between ray U and ray T from the midpoint 40 are intercepted by the refractor area D, whose refracting prisms, in conjunction with the outer surface of the refractor, bend the light rays upwardly. Also, the prisms in area D have decreasing refractive powers from bottom to top so that the diverging light rays between U and T are emitted as parallel rays at the same vertical angle as the light rays X through Z to add to the light in the main beam.

The prisms in section E of the refractor 14, which, it will be recalled, have different refracting powers for the parallel refractive light rays X and Z, become prisms of equal refracting power for the direct light rays between S and R. As a result, each of the direct light rays from the center 40 of the source 19 are bent upwardly through the same angle so that these light rays are spread out at different vertical angles below the main beam.

Direct light rays from the lower point 40' in elongate light source 40 and which pass through the refractor area D will be bent upwardly into parallel rays which have the same vertical angle as the rays X' and Z'. Similarly, rays from the higher point 40" in the elongate source 19 will be refracted into parallel rays having the same vertical angle as the rays X" and Z".

Direct light rays from the lower point 40' in the elongate source 19 and falling in the refractor area E will be bent upwardly at vertical angles above the rays S and R, while direct rays from the upper point 40" will be refracted at a lower vertical angle than the rays S and R.

The prisms in the refractor area F have refracting powers which are equal to each other but different from the refracting power of the prisms in the area E so that the direct light rays from the source 19 falling within the refractor area F are spread at smaller angles than the light rays between S and R falling within the area E.

Figure 7:
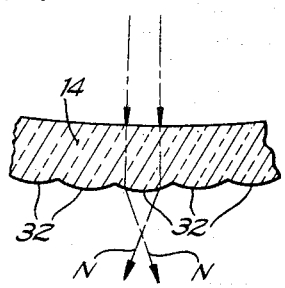
FIG. 7 is a view taken along lines 7—7 of FIG. 1.

Each of the prisms 30 of the inner surface of the refractor 14 is slightly arcuate in cross section as seen in FIG. 6, so that it will give a slight diffusion of light both upward and downward. Thus, the light rays P entering the lower portion of the prism will be bent upward at a greater angle than the light ray L passing through the center portion thereof, while the light ray O passing through the upper end of the prism will be bent at a smaller angle than the ray P. This diffusion of the light rays acts to break up the vertical image of the light source and thereby decrease glare. In addition, the flutes on the outside surface of the reflector 14 spread the emitted light by divergence as shown by light rays N in FIG. 7. This acts to break up the lateral image of the light source, thereby creating a larger apparent light source, to give a low brightness factor.

FIG. 8 shows the lateral distribution of the light from the optical assembly, according to the instant invention.

This light pattern is shown to be symmetrical about a vertical axis.

FIG. 9 shows the candlepower distribution curve in any vertical plane. Here it can be seen that no light is emitted above 90° and substantially all of the light is concentrated below 80°. In addition, the angle of maximum candlepower is approximately 65° from the nadir.

It can be seen from FIGS. 8 and 9 that the optical assembly according to the instant invention provides efficient control of an elongate mercury vapor lamp which is disposed in a vertical position to provide a symmetrical light pattern through a vertical axis and having a relatively wide main beam. In addition, the invention provides a light source having low brightness and a minimum of glare, or upwardly directed light.

While the invention has been discussed with respect to an elongated light source of the mercury vapor type, those skilled in the art will appreciate that other types of elongate light sources may also be employed. In addition, while only a single embodiment of the invention has been shown and described, it is not intended to be limited thereby, but only by the scope of the appended claims.

I claim:

1. The combination of, a gaseous discharge lamp having an elongate light source and being disposed substantially vertically, a sealed optical assembly having a longitudinal axis coincident with said light source and including an inverted generally ovate reflector and a dished refractor, said reflector having a lower marginal rim lying in a substantially horizontal plane and below the lower end of said light source and an upper opening above said light source for receiving lamp support means, said refractor having an upper rim cooperatively engaging the lower rim of said reflector to provide a sealed enclosure for said light source, said reflector having a plurality of adjacently disposed longitudinally extending curvate portions for reflecting the incident light from said source downwardly onto said refractor at the opposite side of said optical assembly and in avoidance of said source, adjacent ones of said reflector portions being arranged to reflect said incident light to the opposite sides of said source, said reflector reflecting incident light originating at any point in said source at a lower angle than that originating at any lower point therein and at a higher angle than that originating at any higher point therein, said reflector being divided into a plurality of longitudinally curvate sections extending circumferentially therearound, at least one of said reflector sections reflecting all of the incident light rays from any point in said source downwardly at substantially the same vertical angle, said refractor having a first plurality of prisms formed on its inner surface and a second plurality of prisms formed on its outer surface.

2. The combination of, a gaseous discharge lamp having an elongate light source and being disposed substantially vertically, a sealed optical assembly having a longitudinal axis coincident with said light source and including an inverted generally ovate reflector and a dished refractor, said reflector having a lower marginal rim lying in a substantially horizontal plane and below the lower end of said light source and an upper opening above said light source for receiving lamp support means, said refractor having an upper rim cooperatively engaging the lower rim of said reflector to provide a sealed enclosure for said light source, said reflector having a plurality of adjacently disposed longitudinally extending curvate portions for reflecting the incident light from said source downwardly onto said refractor at the opposite side of said optical assembly and in avoidance of said source, adjacent ones of said reflector portions being arranged to reflect said incident light to the opposite sides of said source, said reflector reflecting light originating at any point in said source at a lower angle than that originating at any lower point therein and at a higher angle than that originating at any higher point therein, said reflector having three longitudinally curvate sections extending circumferentially therearound, said first reflector section reflecting all of the incident light rays from any point in said source downwardly at substantially the same vertical angle, said second reflector section reflecting all of the incident light from any point in said source substantially to a horizontal circular line adjacent the inner periphery of said refractor, said third reflector section reflecting all of the incident light from any given point so that it tends to converge within said reflector and adjacent said source, said refractor having a plurality of prisms formed on its inner surface and a plurality of longitudinally extending arcuate in cross section refracting prisms formed on its outer surface.

3. The combination of, a gaseous discharge lamp having an elongate light source and being disposed substantially vertically, a sealed optical assembly having a longitudinal axis coincident with said light source and including an inverted generally ovate reflector and a dished refractor, said reflector having a lower marginal rim lying in a substantially horizontal plane and below the lower end of said light source and an upper opening above said light source for receiving lamp support means, said refractor having an upper rim cooperatively engaging the lower rim of said reflector to provide a sealed enclosure for said light source, said reflector having a plurality of adjacently disposed longitudinally extending curvate portions for reflecting the incident light from said source downwardly onto said refractor at the opposite side of said optical assembly and in avoidance of said source, adjacent ones of said reflector portions being arranged to reflect said incident light to the opposite sides of said source, said reflector reflecting incident light originating at any point in said source at a lower angle than that originating at any lower point therein and at a higher angle than that originating at any higher point therein, said refractor having a plurality of prisms formed on its inner surface, at least a portion of said prisms refracting said reflected light through a higher angle relative to the nadir, a portion of said prisms also being disposed to receive a portion of the light from said reflector and for refracting the light from any longitudinal arcuate segment thereof into parallel beams, and a plurality of longitudinal refracting prisms formed on the outer surface of said refractor and being arcuate in cross section and having the same curvature from their lower to their upper ends.

4. The combination of, a gaseous discharge lamp having an elongate light source and being disposed substantially vertically, a sealed optical assembly having a longitudinal axis coincident with said light source and including an inverted generally ovate reflector and a dished refractor, said reflector having a lower marginal rim lying in a substantially horizontal plane and below the lower end of said light source and an upper opening above said light source for receiving lamp support means, said refractor having an upper rim cooperatively engaging the lower rim of said reflector to provide a sealed enclosure for said light source, said reflector having a plurality of adjacently disposed longitudinally extending curvate portions for reflecting the incident light from said source downwardly onto said refractor at the opposite side of said optical assembly and in avoidance of said source, adjacent ones of said reflector portions being arranged to reflect said incident light to the opposite sides of said source, said reflector reflecting incident light originating at any point in said source at a lower angle than that originating at any lower point therein and at a higher angle than that originating at any higher point therein, said reflector having three longitudinally curvate sections extending circumferentially therearound, said first reflector section reflecting all of the incident light from any point in said source downwardly at substantially the same vertical angle, said second reflector section reflecting all of the incident light from any point in said source to a substantially horizontal circular line adjacent the inner periphery of said refractor, said third reflector section reflecting all of the incident light from any given point so that it tends to converge within said reflector and adjacent said source, said refractor having a plurality of prisms formed on its inner surface, at least a portion of said prisms refracting said reflected light upwardly through a higher angle relative to the nadir, a portion of said prisms also being disposed to receive at least a portion of the light from said first reflector section and for refracting the reflected light from longitudinal arcuate segments thereof into parallel beams, and a plurality of longitudinal refracting prisms formed on the outer surface of said refractor and being arcuate in cross section and having the same curvature from their lower to their upper ends.

5. The combination of, a gaseous discharge lamp having an elongate light source and being disposed substantially vertically, an optical assembly including an inverted generally ovate reflector and a dished refractor and being substantially symmetrical about a longitudinal axis coincident with said light source, said reflector having a lower marginal rim lying in a substantially horizontal plane and below the lower end of said light source and an upper opening above said light source for receiving lamp support means, said refractor having an upper rim cooperatively engaging the lower rim of said reflector, said reflector reflecting the incident light from said source downwardly onto said refractor at the opposite side of said optical assembly and in avoidance of said source, said reflector reflecting incident light originating at any point in said source at a lower angle than that originating at any lower point therein and at a higher angle than that originating at any higher point therein, said reflector also being divided into at least a pair of longitudinally curvate sections extending circumferentially therearound, one of said reflector sections reflecting all of the incident light from any point in said source downwardly at substantially the same vertical angle, said refractor having a plurality of prisms formed on its inner surface for refracting said reflected light through a higher angle relative to the nadir, at least a portion of said prisms being disposed to receive substantially all of the reflected light from said first reflector section and for refracting the light originating at any given point in said source to the same vertical angle relative to the nadir to provide a relatively wide main beam which is symmetrical about said axis, light from any given point in said source which is reflected by the other section of said reflector and direct light from said point falling on substantially all portions of said refractor being refracted through vertical angles relative to the nadir which are less than the main beam angle of said point.

6. The combination of, a gaseous discharge lamp having an elongate light source and being disposed substantially vertically, an optical assembly including an inverted generally ovate reflector and a dished refractor and being substantially symmetrical about a longitudinal axis coincident with said light source, said reflector having a lower marginal rim lying in a substantially horizontal plane and below the lower end of said light source and an upper opening above said light source for receiving lamp support means, said refractor having an upper rim cooperatively engaging the lower rim of said reflector, said reflector reflecting the incident light from said source downwardly onto said refractor at the opposite side of said optical assembly and in avoidance of said source, said reflector reflecting incident light originating at any point in said source at a lower angle than that originating at any lower point therein and at a higher angle than that originating at any higher point therein, said reflector also being divided into at least a pair of longitudinally curvate sections extending circumferentially therearound, one of said reflector sections reflecting all of the incident light from any point in said source downwardly at substantially the same vertical angle, said refractor having a plurality of prisms formed on its inner surface and symmetrically around said longitudinal axis, said prisms refracting said reflected light through a higher angle relative to the nadir, at least a portion of said prisms being disposed to receive substantially all of the reflected light from said first reflector section and for refracting the light originating at any given point in said source to the same vertical angle relative to the nadir to provide a relatively wide main beam which is symmetrical about said axis, a second portion of said prisms disposed adjacent the upper end of said rerfactor being constructed and arranged to refract direct light from any given point in said source into parallelism with the portion of the main beam originating at said point, light from any given point in said source which is reflected by the other section of said reflector and direct light from said point falling on substantially all portions of said refractor except said second portion being refracted through vertical angles relative to the nadir which are less than the main beam angle of said point.

7. The combination of, a gaseous discharge lamp having an elongate light source and being disposed substantially vertically, a sealed optical assembly including an inverted generally ovate reflector and a dished refractor and being substantially symmetrical about a longitudinal axis coincident with said light source, said reflector having a lower marginal rim lying in a substantially horizontal plane and below the lower end of said light source and an upper opening above said light source for receiving lamp support means in a sealing relation, said refractor having an upper rim cooperatively engaging the lower rim of said reflector to provide a sealed enclosure for said light source, said reflector reflecting the incident light from said source downwardly onto said refractor at the opposite side of said optical assembly and in avoidance of said source, said reflector also reflecting incident light originating at any point in said source at a lower angle than that originating at any lower point therein and at a higher angle than that originating at any higher point therein, said reflector including three longitudinally curvate sections extending circumferentially therearound, said first reflector section reflecting all of the incident light from any point in said source downwardly at substantially the same vertical angle, said second reflector section reflecting all of the incident light from any point in said source to a substantially horizontal circular line adjacent the inner periphery of said refractor, said third reflector section reflecting all of the incident light from any given point so that it tends to converge within said reflector and adjacent said source, said refractor having a plurality of annular prisms formed on its inner surface and symmetrically around said longitudinal axis, said prisms refracting said reflected light through a higher angle relative to the nadir, a first portion of said prisms also being disposed to receive substantially all of the reflected light from said first reflector section and for refracting the light originating at any given point in said source to the same vertical angle relative to the nadir to provide a reltaively wide main beam which is symmetrical about said axis, a second portion of said prisms disposed adjacent the upper end of said refractor being constructed and arranged to refract direct light from any given point in said source into parallelism with the portion of the main beam originating at said point, light from any given point in said source which is reflected by said second and third reflector sections and direct light from said point falling on substantially all portions of said refractor except said second portion being refracted through vertical angles from the nadir which are less than the main beam angle of said point.

8. The combination of, a gaseous discharge lamp having an elongate light source and being disposed substantially vertically, a sealed optical assembly including an inverted generally ovate reflector and a dished refractor and being substantially symmetrical about a longitudinal axis coincident with said light source, said reflector having a lower marginal rim lying in a substantially horizontal plane and below the lower end of said light source and an upper opening above said light source for receiving lamp support means in a sealing relation, said reflector having an upper rim cooperatively engaging the lower rim of said reflector to provide a sealed enclosure for said light source, said reflector having a plurality of adjacently disposed longitudinally extending curvate portions for reflecting the incident light from said source downwardly onto said refractor at the opposite side of said optical assembly and in avoidance of said source, adjacent ones of said reflector portions being arranged to reflect said incident light to the opposite sides of said source, said reflector also reflecting incident light originating at any point in said source at a lower angle than that originating at any lower point therein and at a higher angle than that originating at any higher point therein, said reflector having three longitudinally curvate sections extending circumferentially therearound, said first reflector section reflecting all of the incident light from any point in said source downwardly at substantially the same vertical angle, said second reflector section reflecting all of the incident light from any point in said source to a substantially horizontal circular line adjacent the inner periphery of said refractor, said third reflector section reflecting all of the light from any given point so that it tends to converge within said reflector and adjacent said source, said refractor having a plurality of annular prisms formed on its inner surface and symmetrically around said longitudinal axis, said prisms refracting said reflected light through a higher angle relative to the nadir, a first portion of said prisms also being disposed to receive substantially all of the reflected light from said first reflector section and for refracting the light originating at any given point in said source to the same vertical angle relato the nadir to provide a relatively wide main beam which is symmetrical about said axis, a second portion of said prisms disposed adjacent the upper end of said refractor being constructed and arranged to refract direct light from any given point in said source into parallelism with the portion of the main beam originating at said point, light from any given point in said source which is reflected by said second and third reflector sections and direct light from said point falling on substantially all portions of said refractor except said second portion being refracted through vertical angels from the nadir which are less than the main beam angle of said point, and a plurality of longitudinal refracting prisms formed on the outer surface of said refractor and being arcuate in cross section and having the same curvature from their lower to their upper ends.

9. The combination of a gaseous discharge lamp having an elongate light source and being disposed substantially vertically, an optical assembly having a longitudinal axis coincident with said light source and including an inverted, generally ovate reflector and a dished refractor, said reflector having a lower marginal rim lying in a substantially horizontal plane and below the lower end of said light source and an upper opening above said light source for receiving lamp support means, said refractor having an upper rim disposed adjacent the lower rim of said reflector, said reflector having means formed thereon for reflecting incident light from said source downwardly onto said refractor at the opposite side of said optical assembly and in avoidance of said source, said reflector reflecting incident light originating at any point in said source at a lower angle than that originating at any lower point therein and at a higher angle than that originating at any higher point therein, said reflector having three longitudinally curvate sections extending circumferentially therearound, one of said reflector sections reflecting substantially all of the incident light from any point in said source downwardly at substantially the same vertical angle, a second reflector section reflecting substantially all of the incident light from any point in said source substantially to a horizontal circular line adjacent the inner surface of said refractor, a third reflector section reflecting substantially all of the incident light from any given point in said source so that the light tends to converge within said reflector and adjacent said source, said refractor having prismatic refracting prisms formed on the surface thereof.

10. The combination of a gaseous discharge lamp having an elongate light source and being disposed substantially vertically, a sealed optical assembly having a longidutinal axis coincident with said light source and including an inverted, generally ovate reflector and a dished refractor, said reflector having a lower marginal rim lying in a substantially horizontal plane below the lower end of said light source and an upper opening above said light source for receiving lamp support means, said refractor having an upper rim engaging the lower rim of said reflector for sealing said optical assembly, said reflector being constructed and arranged to reflect incident light from substantially any point on said elongate source downwardly onto said refractor at the opposite side of said optical assembly and in avoidance of said source, said reflector reflecting incident light originating at any point in said source at a lower angle than that originating at any lower point therein and at a higher angle than that originating at any higher point therein, said reflector also being divided into at least a pair of longitudinal curvate sections extending circumferentially therearound, one of said reflector sections reflecting substantially all of the incident light from any given point in said source downwardly at substantially the same vertical angle, the other of said sections reflecting substantially all light from said point and incident on any arcuate longitudinal line so that the reflected light therefrom tends to converge, said refractor having a plurality of prisms formed on its inner surface, at least a portion of said prisms refracting said reflected light through a higher angle relative to the nadir, a portion of said prisms also being disposed to receive a portion of the reflected light from said reflector and for refracting light originating at any point in said source and reflected from any longitudinal arcuate segment thereof into parallel planes, and a plurality of longitudinal refracting prisms formed on the outer surface of said refractor and being arcuate in cross section and having substantially the same curvature from their lower to their upper ends.

11. The combination of a gaseous discharge lamp having an elongate light source and being disposed substantially vertically, an optical assembly including an inverted, generally ovate reflector and a dished refractor and having a longitudinal axis coincident with said light source, said reflector having a lower marginal rim lying in a substantially horizontal plane and below the lower end of said light source and an upper opening above said light source for receiving lamp support means, said refractor having an upper rim cooperatively engaging the lower rim of said reflector, said reflector reflecting incident light from said source downwardly onto said refractor at the opposite side of said optical assembly and in avoidance of said source, said reflector reflecting incident light originating at any point in said source at a lower angle than that originating at any lower point therein and at a higher angle than that originating at any higher point therein, said reflector also being divided into at least a pair of longitudinally curvate sections extending circumferentially therearound, one of said reflector sections reflecting substantially all of the incident light from any point in said source downwardly at substantially the same vertical angle, said refractor having a plurality of prisms formed on its inner surface for refracting said reflected light through a higher angle relative to the nadir, at least a portion of said prisms being disposed to receive substantially all of the light from said reflector section and for refracting direct light originating at any given point in said source to substantially the same vertical angle relative to the nadir to provide a relatively wide main beam, reflected light from any given point in said source which is reflected by the other section of said reflector and direct light from said point falling on substantially all portions of said refractor being refracted through vertical angles relative to the nadir which are less than the main beam angle of said point.

12. The combination set forth in claim 11 wherein a second portion of said prisms disposed adjacent the upper end of said refractor is constructed and arranged to refract direct light from any given point in said source into parallelism with the portion of the main beam originating at said point.

13. The combination set forth in claim 12 wherein said reflector includes a third longitudinal curvate section extending circumferentially therearound, said third reflector section reflecting substantially all of the incident light from any given point in said source so that it tends to converge within said reflector and adjacent said source.

14. The combination set forth in claim 13 wherein said second reflector section reflects substantially all of the incident light from any point in said source to a substantial horizontal circular line adjacent the inner periphery of said refractor and including a plurality of longitudinally refracting prisms formed on the outer surface of said refractor and being arcuate in cross section and having the same curvature from their lower to their upper ends.

References Cited

UNITED STATES PATENTS

| 2,194,431 | 3/1940 | O'Neil | 240—103 |
| 2,493,087 | 1/1950 | Rolph | 240—25 |
| 2,599,285 | 6/1952 | Rex | 240—25 |

FOREIGN PATENTS 164,141　7/1955　Australia.

NORTON ANSHER, *Primary Examiner.*

W. M. FRYE, *Assistant Examiner.*